(12) United States Patent
Durdin

(10) Patent No.: US 12,714,132 B2
(45) Date of Patent: Aug. 25, 2026

(54) GINGERBREAD HOUSE ASSEMBLY METHOD AND APPARATUS

(71) Applicant: Give and Go Prepared Foods Corp., Etobicoke (CA)

(72) Inventor: Heather Durdin, Milton (CA)

(73) Assignee: Give and Go Prepared Foods Corp., Etobicoke (CA)

( * ) Notice: Subject to any disclaimer, the term of this patent is extended or adjusted under 35 U.S.C. 154(b) by 212 days.

(21) Appl. No.: 18/797,978

(22) Filed: Aug. 8, 2024

(65) Prior Publication Data

US 2024/0397991 A1 Dec. 5, 2024

Related U.S. Application Data

(62) Division of application No. 16/736,433, filed on Jan. 7, 2020, now Pat. No. 12,089,625.

(60) Provisional application No. 62/790,233, filed on Jan. 9, 2019.

(51) Int. Cl.
*A23P 10/10* (2016.01)
*A23P 30/00* (2016.01)

(52) U.S. Cl.
CPC ............... *A23P 10/10* (2016.08); *A23P 30/00* (2016.08); *A23V 2200/08* (2013.01); *A23V 2200/09* (2013.01)

(58) Field of Classification Search
None
See application file for complete search history.

(56) References Cited

U.S. PATENT DOCUMENTS

| | | | |
|---|---|---|---|
| 352,424 | A | 11/1886 | Owen et al. |
| 809,607 | A | 1/1906 | Abraham |
| 1,607,766 | A | 11/1926 | Mcgarvey |

(Continued)

FOREIGN PATENT DOCUMENTS

| | | | |
|---|---|---|---|
| FI | 127584 | B1 | 9/2018 |
| GB | 429204 | A | 5/1935 |

(Continued)

OTHER PUBLICATIONS

Sweetology Youtube Video. Published Dec. 10, 2018. 13pgs <https://www.youtube.com/watch?v=ZW6plAZ-dkY> (Year: 2018).

(Continued)

*Primary Examiner* — Viren A Thakur
(74) *Attorney, Agent, or Firm* — SMART & BIGGAR LP; James Raakman

(57) ABSTRACT

A method for assembling a pair of roof panels to inclined upper edges of a front wall and a back wall of a decorative edible structure includes placing a first roof panel and a second roof panel on respective first and second beads of edible adhesive applied to the inclined upper edges of the front and back walls. A retainer having first and second arms inclined relative to each other by a fixed incline angle is mounted to the decorative edible structure such that a first hook surface on the first arm engages a first lower edge of the first roof panel and a second hook surface on the second arm engages a second lower edge of the second roof panel to hold the first and second roof panels in position on the inclined upper edges at least until the first and second beads of edible adhesive has set.

12 Claims, 9 Drawing Sheets

(56) References Cited

U.S. PATENT DOCUMENTS

| | | | | |
|---|---|---|---|---|
| 2,775,523 | A * | 12/1956 | Green .................... | A47G 33/08 428/7 |
| 4,200,323 | A | 4/1980 | Cocksedge | |
| 4,422,268 | A | 12/1983 | Mueller et al. | |
| 4,431,395 | A | 2/1984 | Babos | |
| 4,593,876 | A | 6/1986 | Greiner | |
| 5,313,747 | A | 5/1994 | Sakihara | |
| 7,210,920 | B2 | 5/2007 | Kolz | |
| D792,675 | S | 7/2017 | Block et al. | |
| D867,716 | S | 11/2019 | Block et al. | |
| 2003/0192219 | A1 | 10/2003 | Vincent | |
| 2009/0232946 | A1 | 9/2009 | Cha | |
| 2010/0221390 | A1 | 9/2010 | Madonia | |
| 2018/0352847 | A1 | 12/2018 | Brown | |
| 2019/0116809 | A1 | 4/2019 | Zeilinger | |
| 2019/0116861 | A1 | 4/2019 | Zeilinger | |

FOREIGN PATENT DOCUMENTS

| | | | |
|---|---|---|---|
| GB | 1452954 | A | 10/1976 |
| KR | 1020130114771 | A | 10/2013 |
| TW | M484392 | U | 8/2014 |

OTHER PUBLICATIONS

Lekberg, Andrea. “Gingerbread House Construction Tips” Nov. 7, 2018 <https://ediblejersey.ediblecommunities.com/things-do/gingerbread-house-construction-tips> (Year: 2018).

“Sweetopia” Youtube.com Dec. 16, 2011 <https://www.youtube.com/watch?v=2xcRkk3URQA> (Year: 2011).

“Crouton Crackerjacks” Youtube.com Dec. 12, 2015 <https://www.youtube.com/watch?v=gt7cBo9VdhQ> (Year: 2015).

* cited by examiner 250
214
276
272
302
290
300
300'
294
278
292
216

GINGERBREAD HOUSE ASSEMBLY METHOD AND APPARATUS

This application is a Divisional application of U.S. Ser. No. 16/736,433, filed Jan. 7, 2020, which claims the benefit of Provisional Application Ser. No. 62/790,233, filed Jan. 9, 2019, both of which are hereby incorporated herein by reference.

FIELD

The teachings herein relate to retainers and methods for assembling decorative edible structures.

Introduction

U.S. Pat. No. 7,210,920 (Kolz) discloses panels that are adapted to be joined together to form a decorative structure. The panels have tabs that are sized and positioned to provide a dovetail joint along each edge of the structure. The protruding tabs or ends are of a slightly smaller dimension than the notches that they fit inside of to provide a secure fit. This self-interlocking design allows each individual piece of the structure to be fitted together, one at a time, while maintaining an acceptable degree of stability throughout the assembly process.

U.S. Patent Application Publication No. 2009/0232946 (Cha) discloses an edible panel for building a self-interlocking model and a self-interlocking model kit comprising the same edible panel(s), in which the edible panel can be freely molded when it is in a dough state but is transformed into a cookie which is not be deformed or molded after calcining, wherein the edible panels are manufactured into a variety of shapes so that they can be assembled into a variety of models, such as a house model or a ship model, and a user can eat the edible panels after assembling them into a model and baking it, as well as have an experience of assembling the self-interlocking model kit into a self-interlocking model, and appreciating the model assembled by himself or herself using the self-interlocking model kit. The user further can use the self-interlocking model kit comprising the edible panels as celebration gifts.

SUMMARY OF VARIOUS EMBODIMENTS

This summary is intended to introduce the reader to various aspects of the applicant's teaching, but not to define any invention. In general, disclosed herein are one or more retainers and methods using the retainer to assemble roof panels of a decorative edible structure.

In accordance with at least one aspect of the teachings described herein, a method for assembling a pair of roof panels to a front wall and a back wall of a decorative edible structure, includes the steps of: (a) applying a first bead of edible adhesive to each of a first inclined upper edge and a first back inclined upper edge of the front and back walls; (b) after step (a), and before the first bead of edible adhesive sets, placing a first roof panel on the first bead of edible adhesive; (c) applying a second bead of edible adhesive to each of a second front inclined upper edge and a second back inclined upper edge of the front and back walls; (d) after step (c), and before the second bead of edible adhesive sets, placing a second roof panel on the second bead of edible adhesive; and (e) mounting a retainer to the decorative edible structure in engagement with the first and second roof panels to hold the first and second roof panels in position on the first and second edges at least until each of the first and second beads of edible adhesive has set.

In some examples, after each of the first and second beads of edible adhesive has set, the retainer is removed without displacing either of the first and second roof panels.

In some examples, after each of the first and second beads of edible adhesive has set, the retainer remains in place as a decoration on the decorative edible structure. In some examples, the first and second roof panels are joined by a third bead of edible adhesive applied along a joint between adjacent upper edges of each of the first and second roof panels.

According to some aspects, a decorative edible structure includes: (a) a front wall and a back wall, each of the front and back walls having a first inclined upper edge and a second inclined upper edge defining a peak; (b) a first roof panel supported by the first inclined upper edges of the front and back walls; (c) a second roof panel supported by the second upper edges of the front and back walls; and (d) a retainer having a body with a first hook surface and a second hook surface, the first and second hook surfaces spaced apart from each other along the body for engaging the first and second roof panels to temporarily inhibit sliding of the first and second roof panels downwardly along the inclined upper edges of the front and back walls.

In some examples, an edible adhesive joins the first roof panel to the first inclined upper edges of the front and back walls and joins the second roof panel to the second inclined upper edges of the front and back walls.

In some examples, the edible adhesive has an unset state in which the edible adhesive is flowable, and a set state in which the edible adhesive is generally solidified and securely holds together two or more elements in contact with the adhesive. In some examples, when the edible adhesive is in the set state, the retainer is disengagable from the first and second roof panels without separating the first and second roof panels from each other or from the front and back walls.

In some examples, the edible adhesive may be an icing, for example, royal icing. In some examples, the edible adhesive transitions from the unset state to the set state upon exposure to air for a period of time defining a setting time. The setting time is, in some examples, generally in the range of about five to about ten minutes. In some examples, when the edible adhesive is applied to a surface in the unset state, there is an adhesive force created between the edible adhesive and the surface as well as a cohesive force within the edible adhesive. As the edible adhesive sets, the adhesive force and the cohesive force increase in strength.

In some examples, the decorative edible structure includes a first side wall having a first front contact surface connected to a first side edge region of the front wall and a first back contact surface connected to a first side edge region of the back wall, and a second side wall having a second front contact surface connected to a second side edge region of the front wall and a second back contact surface connected to a second side edge region of the back wall. In some examples, the decorative edible structure includes a base for supporting the front wall, the back wall, and the first and second side walls. In some examples, the base includes a canal defined by a downwardly extending recess that generally extends about a lower perimeter of the edible structure, the canal for receiving a volume of edible adhesive, a lowermost portion of the first and second side walls, and a lowermost portion the front and back walls.

In some examples, the adhesive force acting between the edible adhesive and the roof panel and/or the cohesive force acting within the adhesive is less than the force of gravity urging the roof panel to slide downward along the inclined edge to which it has been mounted.

According to some aspects, a retainer for temporarily holding in place a pair of inclined roof panels of a decorative edible structure includes: (a) a first hook surface on a body for engaging a first lower edge of a first inclined roof panel; and (b) a second hook surface on the body for engaging a second lower edge of a second inclined roof panel. The first and second hook surfaces spaced apart from each other along the body. When in use, the body holds the first and second hook surfaces in engagement with the first and second lower edges.

In some examples, the body is positionable about the first and second inclined roof panels. In some examples, the body includes a first arm extending in a first arm direction from a first arm proximal end to a first arm distal end. The body further includes, in some examples, a second arm extending in a second arm direction away from a second arm proximal end to a second arm distal end. The first arm direction and second arm direction are angularly offset from each other such that when the body is positioned about the first and second inclined roof panels, the first arm follows the a first pitch of the first roof panel and the second arm follows a second pitch of the second roof panel.

In some examples, the body is generally planar and is sufficiently rigid to resist deforming at least within the plane of the body when subjected to forces exerted on the body during normal use.

In some examples, the body includes a first finger projecting inwardly from the first arm in a direction generally aligned with the second arm direction. In some examples, the first finger is spaced apart from the second arm along the first arm defining a first roof panel gap to accommodate the first inclined roof panel. In some examples, the first finger has a first finger inner edge surface directed toward the second arm, and the first hook surface comprises at least a portion of the first finger inner edge surface. In some examples, the first finger further includes at least one tab for adjusting the position of the first hook surface, the at least one moveable tab moveable between an extended position and a retracted position, wherein the first roof panel gap is extended by moving the at least one moveable tab from the extended position to the retracted position.

In some examples, the body includes a second finger projecting inwardly from the second arm in a direction generally aligned with the first arm direction. In some examples, the second finger is spaced apart from the first arm along the second arm defining a second roof panel gap to accommodate the second inclined roof panel. In some examples, the second finger has a second finger inner edge surface directed toward the first arm, and the second hook surface comprises at least a portion of the second finger inner edge surface. In some examples, the second finger further includes at least one tab for adjusting the position of the second hook surface, the at least one moveable tab of the second finger moveable between an extended position and a retracted position, wherein the second roof panel gap is extended by moving the at least one moveable tab of the second finger from the extended position to the retracted position.

In some examples, the retainer includes a cut-out in the body where the two arms meet for providing clearance between the retainer and the decorative edible structure when in use.

According to some aspects, a kit of parts for a decorative edible structure includes: (a) a pair of peaked walls; (b) a pair of roof panels; and (c) a retainer having a body with a first and a second hook surface spaced apart from each other along the body for temporarily engaging the pair of roof panels in an assembled position.

In some examples, the kit includes a volume of an edible adhesive. In some examples, the kit includes a pair of side walls. In some examples, the kit includes a base. In some examples, the kit includes a plurality of decorations. The decorations can include edible decorations and/or non-edible decorations. In some examples, the kit includes instructions describing how to assemble the decorative edible structure. In some examples, the retainer includes at least one string.

According to some aspects, a method for assembling a pair of roof panels to an edible front wall and an edible back wall of a decorative edible structure includes: (a) applying a first bead of edible adhesive to each of a first inclined upper edge of the edible front wall and a first inclined upper edge of the edible back wall; (b) after step (a), and before the first bead of edible adhesive sets, placing a first roof panel on the first bead of edible adhesive; (c) applying a second bead of edible adhesive to each of a second inclined upper edge of the edible front wall and a second inclined upper edge of the edible back wall; (d) after step (c), and before the second bead of edible adhesive sets, placing a second roof panel on the second bead of edible adhesive, wherein the second roof panel is inclined relative to the first roof panel by a peak angle; (e) picking up a retainer, the retainer having a planar body with a first arm extending along a first arm axis and a second arm fixed to the first arm and extending along a second arm axis, the first arm axis inclined relative to the second arm axis by a fixed incline angle matching the peak angle; and (f) after step (e), mounting the retainer to the decorative edible structure such that the first arm is disposed above the first roof panel, the second arm is disposed above the second roof panel, and a first hook surface on the first arm engages a first lower edge of the first roof panel and a second hook surface on the second arm engages a second lower edge of the second roof panel to hold the first and second roof panels in position on the first and second inclined upper edges at least until each of the first and second beads of edible adhesive has set.

In some examples, after each of the first and second beads of edible adhesive has set, the retainer is removed without displacing either of the first and second roof panels. In some examples, after each of the first and second beads of edible adhesive has set, the retainer remains in place as a decoration on the decorative edible structure.

In some examples, the method includes applying a third bead of edible adhesive along an upper edge of each of the first and second roof panels to join the first and second roof panels together.

In some examples, step (e) includes severing a cardboard panel along lines forming an outline of the retainer to separate the retainer from the cardboard panel.

According to some aspects, a method for assembling a pair of roof panels to an edible front wall and an edible back wall of a decorative edible structure includes: (a) applying a first bead of edible adhesive to each of a first inclined upper edge of the edible front wall and a first inclined upper edge of the edible back wall; (b) placing a first roof panel on the first bead of edible adhesive before the first bead of edible adhesive sets; (c) applying a second bead of edible adhesive to each of a second inclined upper edge of the edible front wall and a second inclined upper edge of the edible back wall; (d) placing a second roof panel on the second bead of edible adhesive before the second bead of adhesive sets, wherein the second roof panel is inclined relative to the first roof panel by a peak angle; and (e) mounting a retainer to the decorative edible structure, such that a first arm of the retainer is disposed above and follows a pitch of the first roof panel and a first hook surface on the first arm engages a first lower edge of the first roof panel, and a second arm of the retainer is disposed above and follows a pitch of the second roof panel and a second hook surface on the second arm engages a second lower edge of the second roof panel to hold the first and second roof panels in position on the first and second inclined upper edges at least until each of the first and second beads of edible adhesive has set, wherein the first and second arms are together formed of integral, unitary, cardboard construction.

In some examples, the method includes, prior to mounting retainer to the decorative edible structure, severing a cardboard panel along lines forming an outline of the retainer to separate the retainer from the cardboard panel.

According to some aspects, a method for assembling a pair of roof panels to a front wall and a back wall of a decorative edible structure is disclosed, wherein the front wall has a first inclined upper edge and a second inclined upper edge and the back wall has a first inclined upper edge and second inclined upper edge, the first and second inclined upper edges of each of the front wall and the back wall inclined relative to one another by a peak angle. The method includes (a) applying a first bead of edible adhesive to the first inclined upper edges of each of the front and back walls; (b) after step (a), and before the first bead of edible adhesive sets, placing a first roof panel on the first bead of edible adhesive; (c) applying a second bead of edible adhesive to the second inclined upper edges of each of the front and back walls; (d) after step (c), and before the second bead of edible adhesive sets, placing a second roof panel on the second bead of edible adhesive; and (e) mounting a retainer to the decorative edible structure, the retainer having a planar body including a first arm extending along a first arm axis and a second arm fixed to the first arm and extending along a second arm axis, the first arm axis inclined relative to the second arm axis by a fixed incline angle matching the peak angle, the first arm including a first finger projecting from the first arm in the same direction as the second arm axis and having a first hook surface directed toward the second arm, and the second arm including a second finger projecting from the second arm in the same direction as the first arm axis and having a second hook surface directed toward the first arm, wherein when the retainer is mounted to the decorative edible structure, the first hook surface and the second hook surface engage respective lower edges of the first roof panel and the second roof panel to hold the first roof panel and the second roof panel in position on the first and second edges at least until each of the first and second beads of edible adhesive has set.

In some examples, the method includes applying a third bead of edible adhesive along an upper edge of each of the first and second roof panels to join the first and second roof panels together. In some examples, the method includes severing a cardboard panel along lines forming an outline of the retainer to separate the retainer from the cardboard panel.

DRAWINGS

The drawings included herewith are for illustrating various examples of retainers for edible structures that include one or more aspects of the teaching of the present specification and are not intended to limit the scope of what is taught in any way. In the drawings.

DETAILED DESCRIPTION OF THE EMBODIMENTS

Various apparatuses, and/or methods will be described below to provide an example of an embodiment of the invention. No embodiment described below limits any claimed invention and any claimed invention may cover apparatuses or methods that differ from those described below. The claimed inventions are not limited to apparatuses or methods having all of the features of any one apparatus or method described below or to features common to multiple or all of the apparatuses described below. It is possible that an apparatus or method described below is not an embodiment of any claimed invention. Any invention disclosed in an apparatus or method described below that is not claimed in this document may be the subject matter of another protective instrument, for example, a continuing patent application, and the applicants, inventors or owners do not intend to abandon, disclaim or dedicate to the public any such invention by its disclosure in this document.

Figure 1:
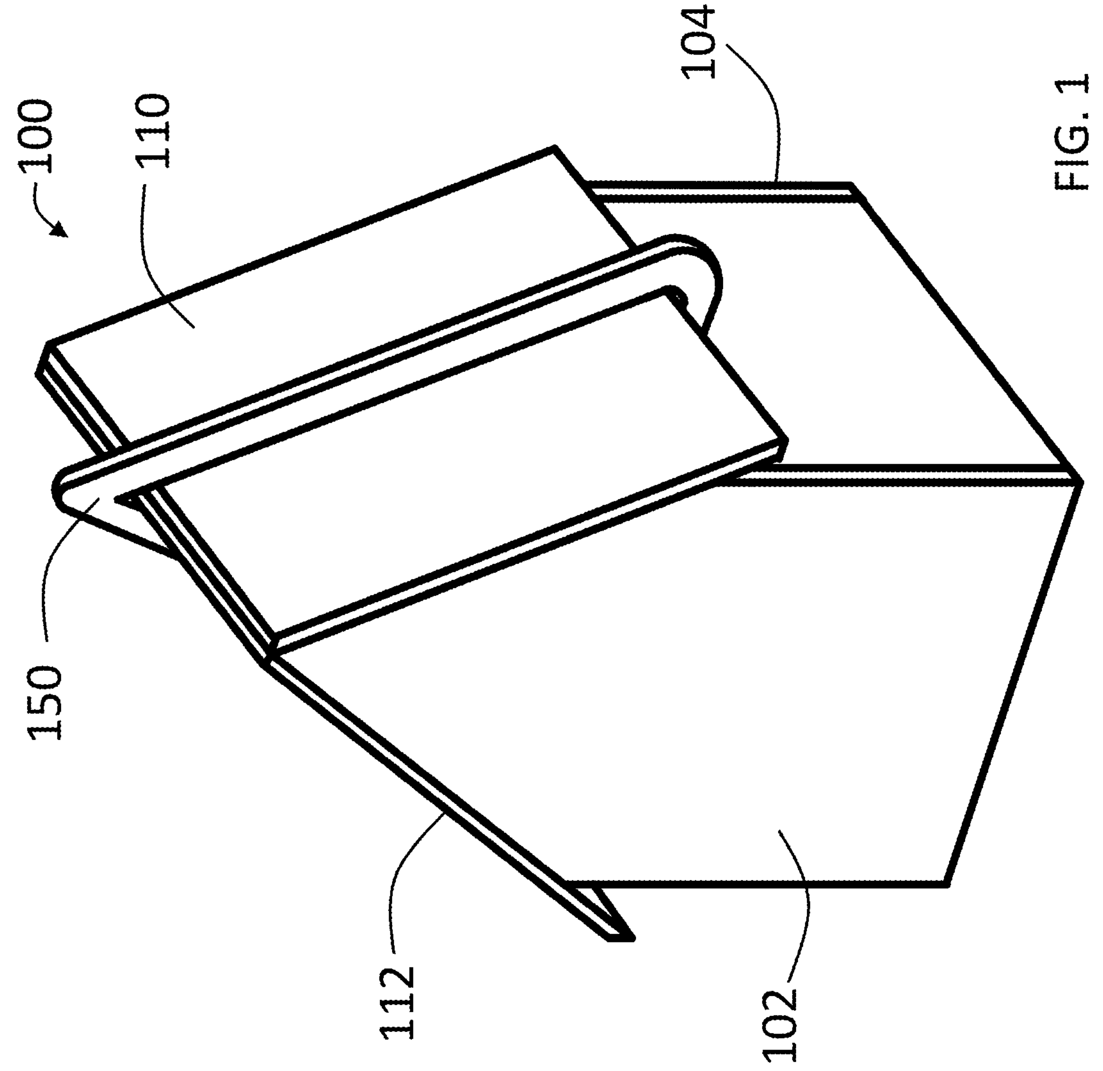
FIG. 1 is a perspective view of a decorative edible structure with a retainer mounted in engagement with roof panels of the decorative edible structure.

Referring to FIG. 1, a decorative edible structure 100 includes a front wall 102 and a back wall 104. In the example illustrated, the front and back walls 102, 104 are generally parallel to one another and are spaced orthogonally apart from each other. A first roof panel 110 and a second roof panel 112 are supported by at least the front and back walls 102, 104. The edible structure further includes a first side wall 106 and a second side wall 108, extending lengthwise of the edible structure between the front and back walls. The walls 102, 104, 106, 108 and roof panels 110, 112 are, in the example illustrated, made of an edible gingerbread product.

Figure 2:
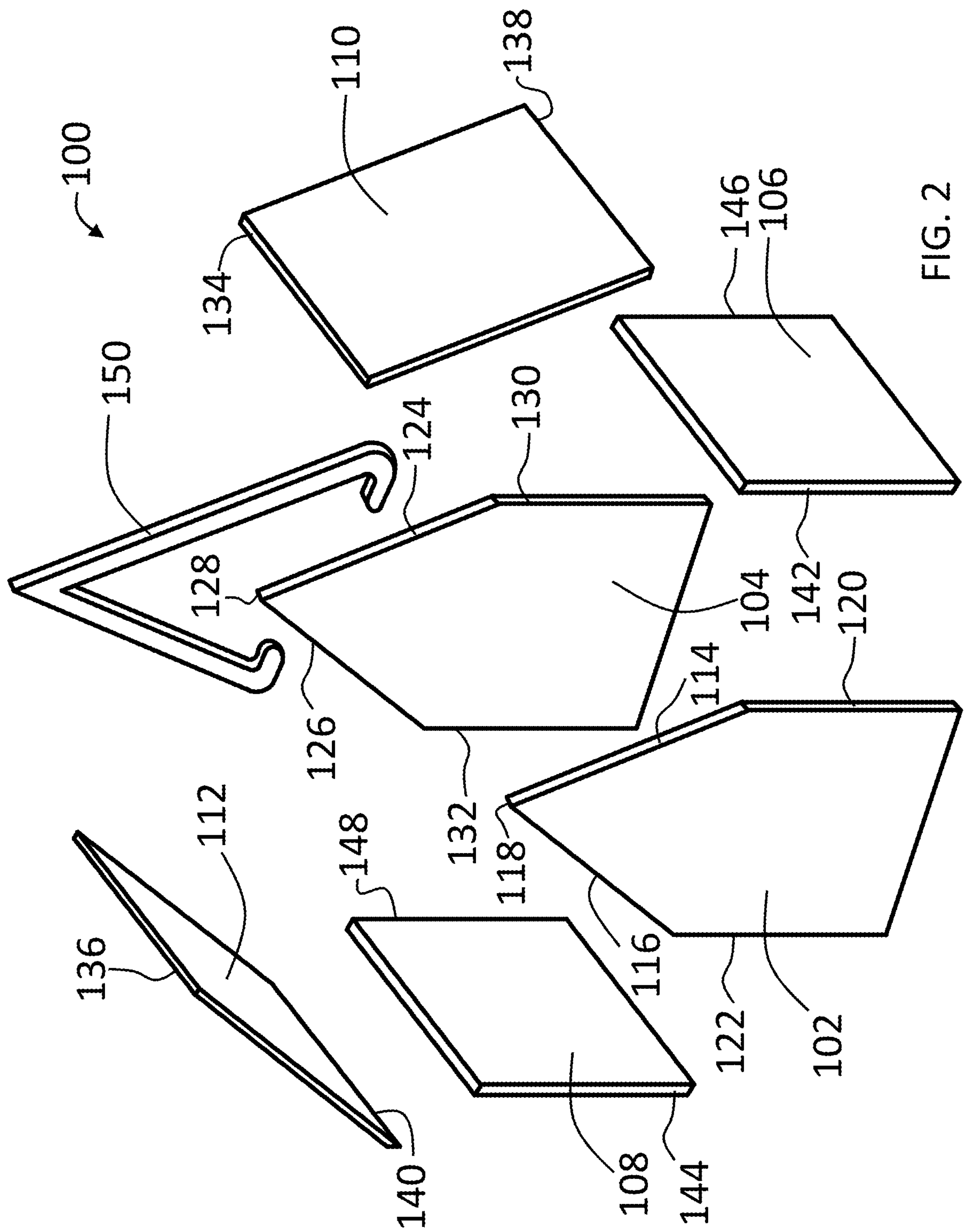
FIG. 2 is an exploded view of the decorative edible structure of FIG. 1.

Referring now to FIG. 2, an exploded view of the decorative edible structure 100 is shown. In the example illustrated, the front wall 102 has a first front inclined upper edge 114 and a second front inclined upper edge 116. The first front inclined upper edge 114 and the second front inclined upper edge 116, in the example illustrated, terminate at a common front upper point or peak 118. The front wall 102 also includes a first front side edge 120 extending generally vertically downward from a lower end of the first front inclined upper edge, and a second front side edge 122 extending generally vertically downward from a lower end of the second front inclined upper edge.

Similarly, the back wall 104 includes a first back inclined upper edge 124 and a second back inclined upper edge 126 with generally coterminous upper ends forming a back peak 128. In the example illustrated, the back wall 104 includes a first back side edge 130 and a second back side edge 132. When assembled, as illustrated in FIG. 1, the front wall 102 is generally aligned with the back wall 104, such that the first front and back inclined upper edges 114, 124 are generally parallel to each other, and the second front and back inclined upper edges 116, 126 are generally parallel to each other.

In the example illustrated, each roof panel 110, 112 has an upper edge 134, 136 and a lower edge 138, 140, respectfully. When assembled, as seen in FIG. 1, the first roof panel 110 is supported by the first front and back inclined upper edges 114, 124 of the front and back walls 102, 104. When assembled, the second roof panel 112 is supported by the second front and back inclined upper edges 116, 126 of the front and back walls 102, 104. When the roof panels 110, 112 are placed on the upper inclined edges 114, 116, 124, 126, the upper edges 134, 136 of the first and second roof panels 110, 112 generally extend in parallel along the top of the roof to form a ridge extending between the front and back peaks 118, 128.

During assembly of the edible structure, an edible adhesive can be used to secure together the walls and roof panels. The edible adhesive may be an icing, for example, royal icing. In the example illustrated, the edible adhesive has an unset state in which the edible adhesive is flowable, and a set state in which the edible adhesive is generally solidified and securely holds together two or more elements in contact with the edible adhesive. In the example illustrated, the edible adhesive transitions from the unset state to the set state upon exposure to air for a period of time defining a setting time. The setting time is generally in the range of about five to about ten minutes.

When an edible adhesive is applied to a surface in the unset state, there is an adhesive force created between the edible adhesive and the surface as well as a cohesive force within the edible adhesive. As the edible adhesive sets, the adhesive force and the cohesive force increase in strength.

In the example illustrated, assembly of the edible structure can begin by placing a bead of edible adhesive in the canal of the base member. Two perpendicular walls, for example the first side wall 106 and the front wall 102, can have their lower ends pushed into respective perpendicular portions of the canal, with a first side edge 142 of the side wall 106 abutting the front wall 102 proximate to the first side edge 120, forming a first front corner joint. Optionally a further bead of edible adhesive can be applied in the first front corner joint.

Another wall, for example the second side wall 108, can have its lower end pushed into a respective portion of the canal with a second side edge 144 of the second wall 108 proximate the second edge 122 of the front wall 102 to form a second front corner joint. The second corner joint can optionally include a bead of edible adhesive extending along its height.

The remaining wall, i.e. the back wall 104 in this example, can be installed by pressing its lower end into a respective portion of the canal, with a back wall first side edge 130 proximate a first side wall back edge 146, forming a first back corner joint, and a back wall second side edge 132 proximate a second side wall back edge 148, forming a second back corner joint. A bead of edible adhesive can be optionally applied in each of the first and second back corner joints.

To assemble the roof panels, in the example illustrated, a bead of edible adhesive in the unset state is applied to the first front and back inclined upper edges 114, 124. While the bead of edible adhesive is still in the unset state, the first roof panel 110 is positioned on the edible adhesive on the edges 114, 124. Similarly, the second roof panel 112 can be positioned on beads of adhesive applied to the second front and back upper inclined edges 116, 126 of the front and back walls 102, 104 while the adhesive is in the unset state.

The inventors have learned that after the roof panels have been assembled, but before the adhesive has set, the force of gravity acting on a roof panel will generally cause the roof panel to slide downwardly and out of position along the inclined edges upon which the panel is supported. A person assembling the edible structure can hold the roof panels 110, 112 in place with their hands for the duration of the setting time, but this can stall the assembly process and be inconvenient since the person cannot carry out other tasks with their hands during the setting time.

Figure 3:
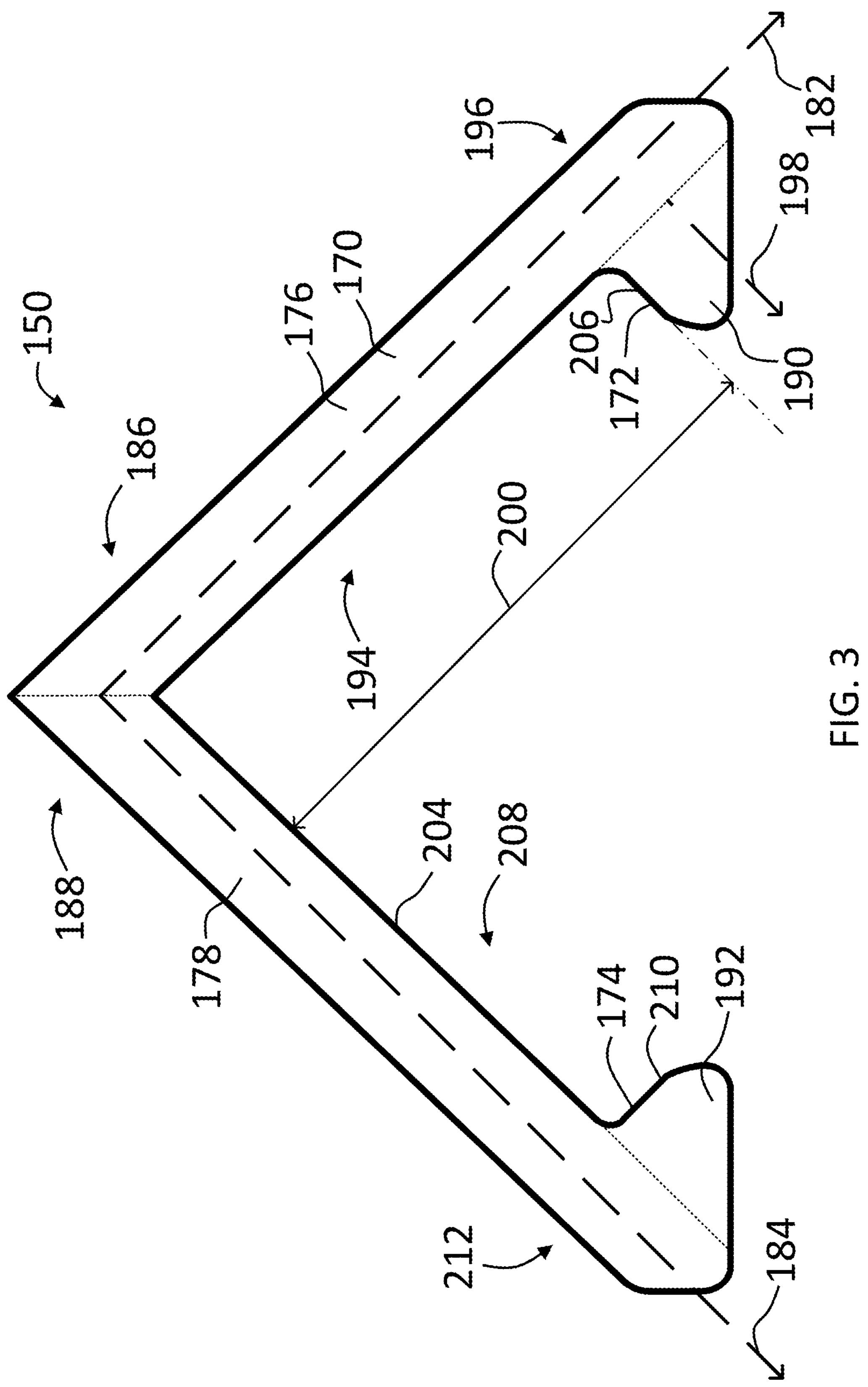
FIG. 3 is a front view of the retainer of FIG. 1.

Referring to FIG. 3, an example of a retainer 150 for facilitating assembly of roof panels is illustrated. The retainer 150, in the example illustrated, includes a body 170 having a first hook surface 172 and a second hook surface 174. The first and second hook surfaces 172, 174 are spaced apart from each other along the body 170. The first and second hook surfaces 172, 174 are for engaging the first and second roof panels 110, 112 to resist downward sliding of the panels before the edible adhesive has set. For example, when in use (as illustrated in FIG. 1), the first hook surface 172 engages the first roof panel 110 and the second roof panel 112 engages the second hook surface 174. More specifically, in the example illustrated, the first hook surface 172 engages the lower edge 138 of the first inclined roof panel 110, and the second hook surface 174 engages the lower edge 140 of the second inclined roof panel 112.

Still referring to FIG. 3, the body 170 of the retainer 150 includes a first arm 176 and a second arm 178. The first arm 176 and the second arm 178 are, in the example illustrated, generally coplanar, defining a retainer plane.

The first arm 176 has a first arm proximal portion 186 and the second arm has a second arm proximal portion 188 that, in the example illustrated, are joined together and are proximate the ridge of the edible structure when in use (the arm proximal portions 186, 188 may also be referred to as arm upper portions). In the example illustrated, the body 170, including the arms 176 and 178, is of integral, unitary construction. The arms 176 and 178 are generally in fixed position relative to each other and the body is of sufficient strength and rigidity to maintain its shape when subjected to forces normally expected during use. In the example illustrated, the body 170 is formed of cardboard having sufficient stiffness to resist deflection of one arm relative to the other, at least within the retainer plane (oriented generally vertically when in use).

The first arm 176 has a first arm axis 182 that extends downwardly away from the distal region 188 of the second arms 176. The second arm 178 has a second arm axis 184 extending downwardly away from the upper region 186 of the first arm 176.

The direction of the first arm axis 182 of the first arm 176 relative to the second arm axis 184 of the second arm 178 is designed to match the incline of the first inclined edges 114, 124 relative to the second inclined edges 116, 126. This can help to have the first arm 176 substantially follow the incline of the first roof panel 110 and the second arm 178 follow the inclined of the second roof panel 112 when in use.

Referring still to FIG. 3, in the example illustrated, the body 170 includes a first finger 190. The first finger 190 projects from a distal end region 196 of the first arm 176 spaced apart from and in a direction generally aligned with the second arm axis. In the example illustrated, the first finger 190 is spaced apart from the second arm 178 along the first arm 176 by a distance defining a first roof panel gap 194. The first roof panel gap 194 has a gap length 200 extending from an inner edge surface 204 of the second arm 178 to an inner edge surface 206 of the first finger 190. When in use, the first roof panel gap 194 accommodates the first roof panel 110 placed on the inclined upper edges 114, 124. In the example illustrated, the first finger inner edge surface 206 is directed toward the second arm 178 and first hook surface 172 includes at least a portion of the first finger inner edge surface 206.

In the example illustrated, the body 170 of the retainer 150 further includes a second finger 192. The second finger 192 of the retainer 150 projects from a distal region 212 of the second arm 178 spaced apart from and in a direction generally aligned with the first arm axis 182. The second finger 192 is spaced apart from the first arm 176 along the second arm 178 to define a second roof panel gap 208 to accommodate, when in use, the second roof panel 112 placed on the second inclined upper edges 116, 126. In the example illustrated, the second finger 192 has a second finger inner edge surface 210. The second finger inner edge surface 210 is substantially directed toward the first arm 176, and the second hook surface 174 includes at least a portion of the second finger inner edge surface 210.

Figure 4:
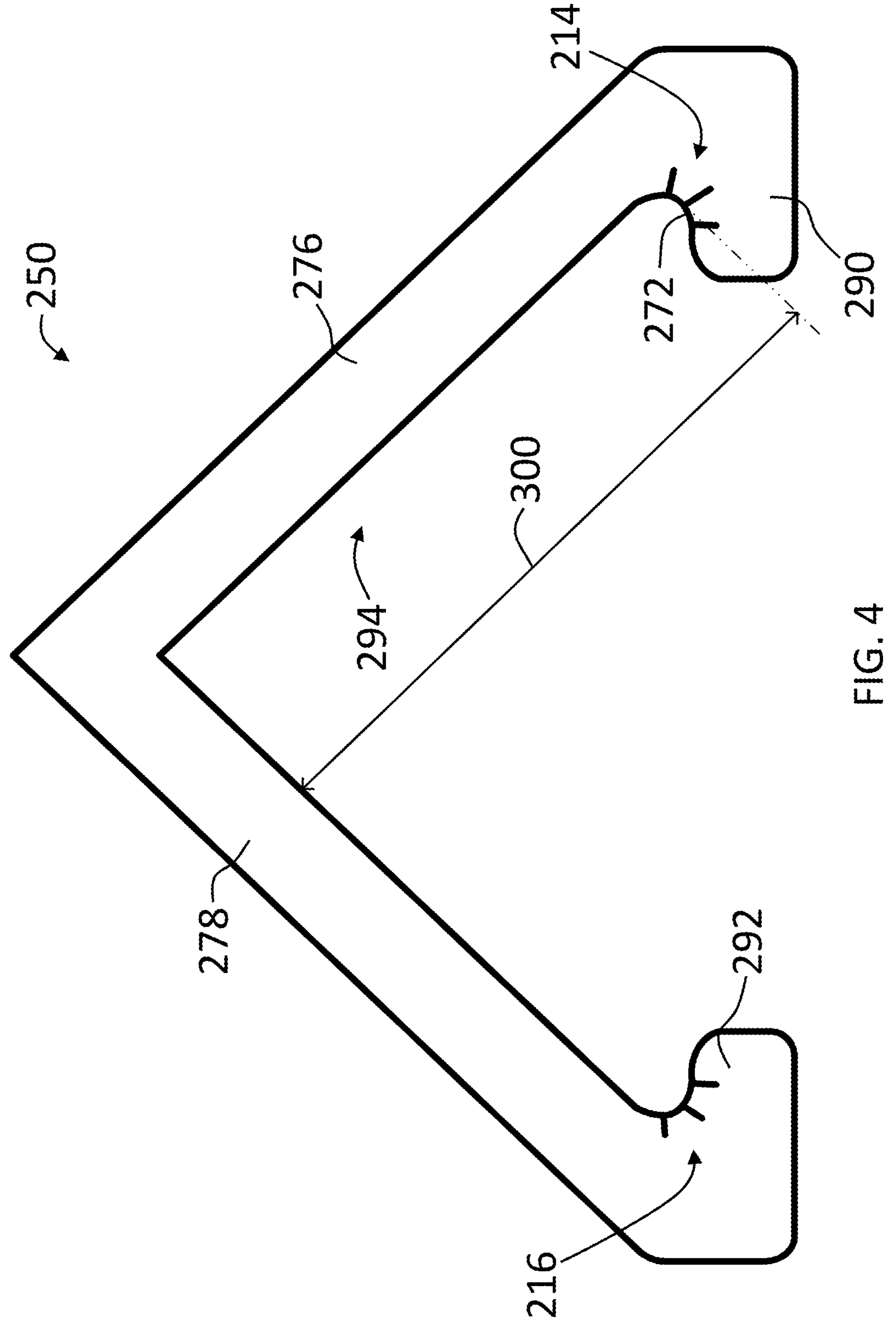
FIG. 4 is a front view of another example of the retainer of FIG. 3 having at least one tab, the at least one tab in an extended position.
Figure 5:
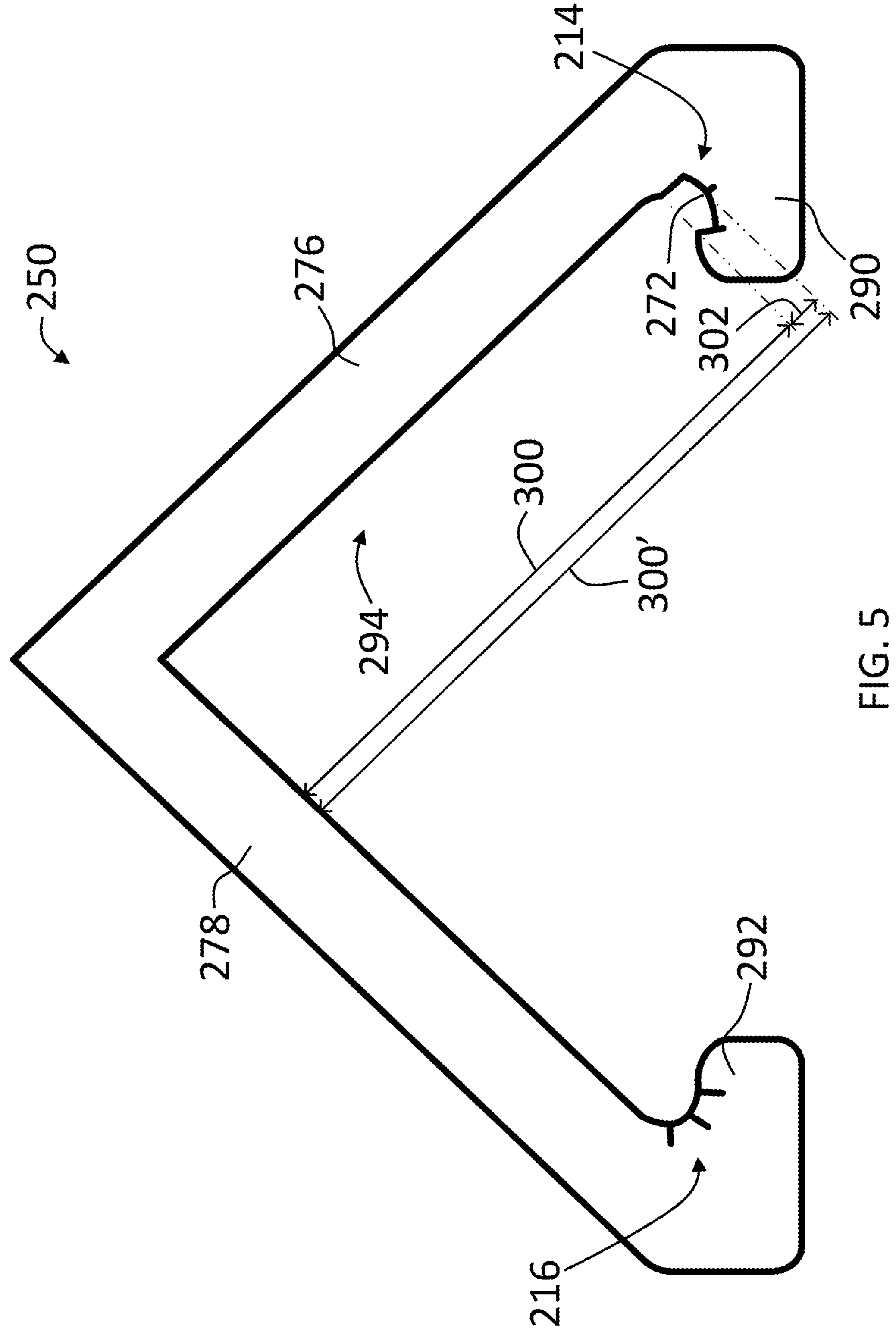
FIG. 5 is a front view of the retainer of FIG. 4 with at least one of the at least one tab in a retracted position.

Referring now to FIGS. 4 and 5, a second example of a retainer 250 is shown having similarity to the retainer 150, with like features indicated by like reference characters, incremented by 100. The retainer 250, in the example illustrated, includes a first arm 276 extending in a first arm direction, and a second arm 278 extending in a second arm direction. The retainer 250 includes a first finger 290 projecting from the first arm spaced apart from, and generally in the same direction as, the second arm. The first finger 290 comprises at least a portion of a first hook surface 272 for engaging a first roof panel. The first finger 290 includes at least one tab 214. The at least one tab 214 may be moved to adjust the position of the first hook surface 272. For example, the at least one tab 214 may be moved from an extended position, as illustrated in FIG. 4, to a retracted position, as illustrated in FIG. 5. Adjusting at least one of the at least one moveable tab 214, a roof panel gap 294 of the retainer 250 is lengthened from a length 300 to a length 300', or by a distance 302. In the example illustrated, a second finger 292 of body 270 may also include at least one moveable tab 216.

Figure 6:
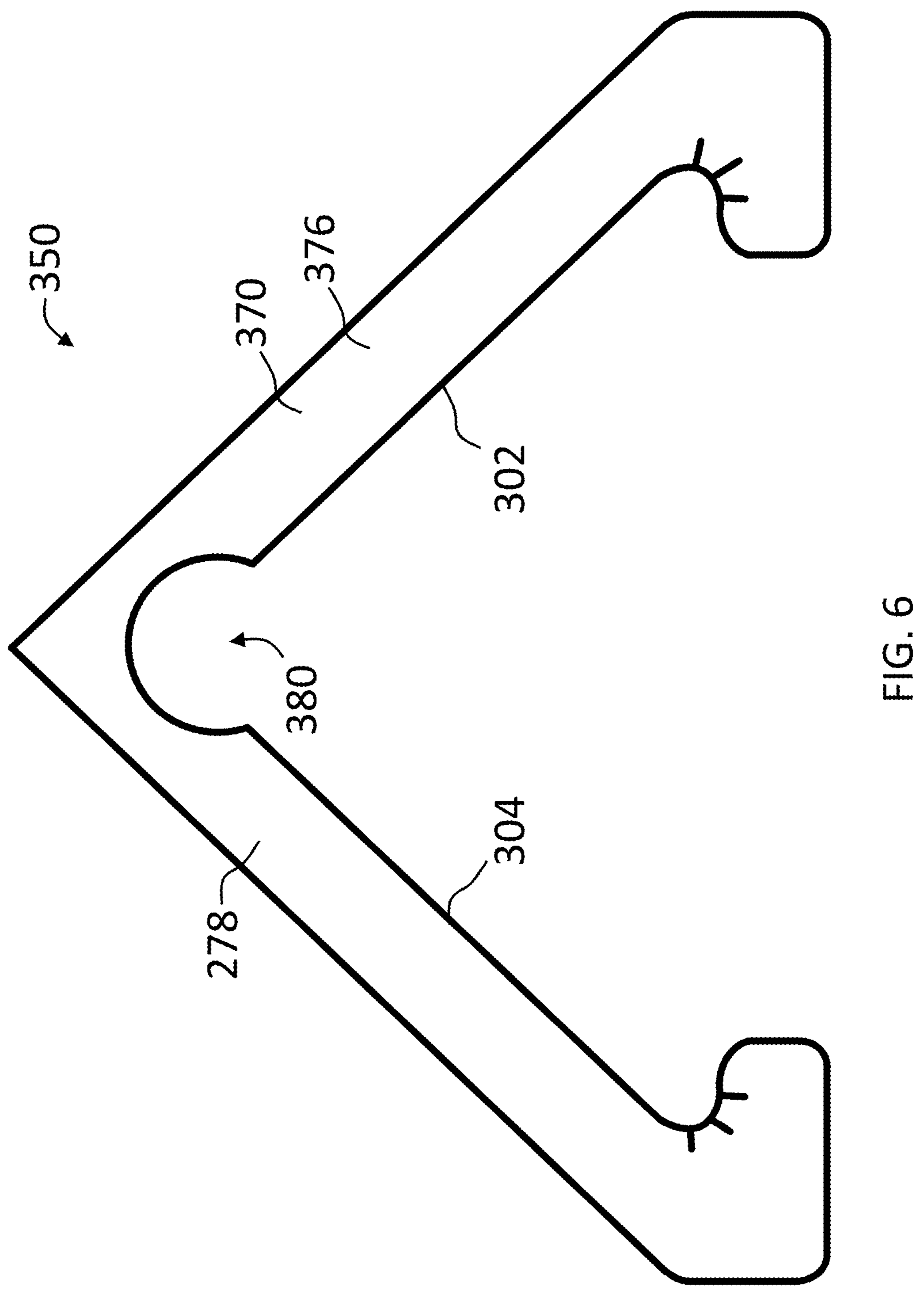
FIG. 6 is another example of the retainer of FIG. 3 having a cut-out.

Referring now to FIG. 6, another example of a retainer 350 is shown. The retainer 350 is similar to the retainer 250, with like features indicated by like reference characters, incremented by 100. In the example illustrated, the retainer 350 includes a cut-out 380 in the body 370 proximate a region where a first arm 376 and a second arm 378 connect. More specifically, the cut-out 380 is cut into an inner edge 302 of the first arm 376 and an inner edge 304 of the second arm 378 at a region between upper regions 386, 388. When in use, the cut-out 380 of the retainer 350 provides clearance between the retainer 350 and the decorative edible structure 100 and can facilitate removal of the retainer once construction of the edible structure us complete by helping to ensure that that a bead of edible adhesive placed along the ridge formed by the roof panels is not engaged by the retainer.

Figure 7:
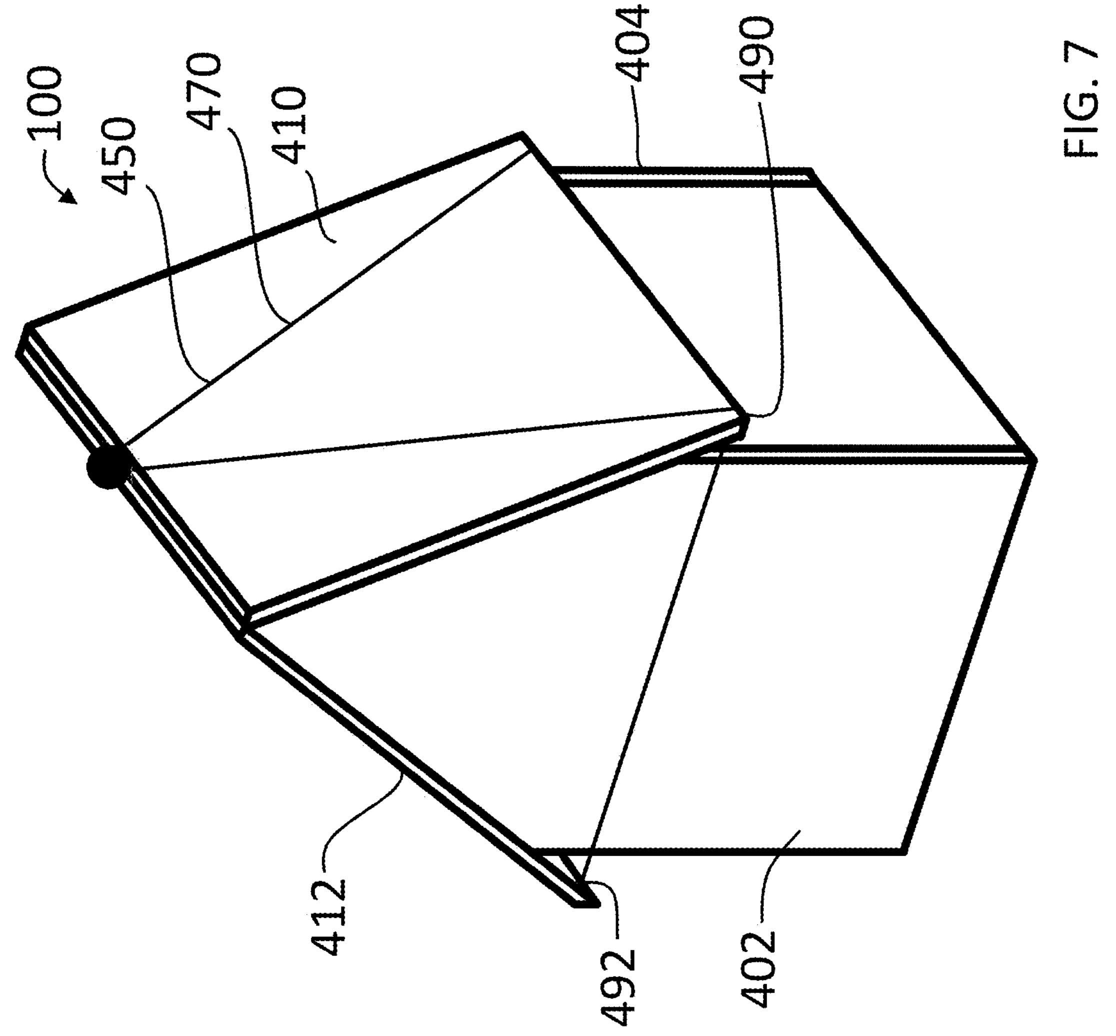
FIG. 7 is a perspective view of the decorative edible structure of FIG. 1 with an alternative embodiment of a retainer mounted in engagement with the roof panels of the decorative edible structure.
Figure 8:
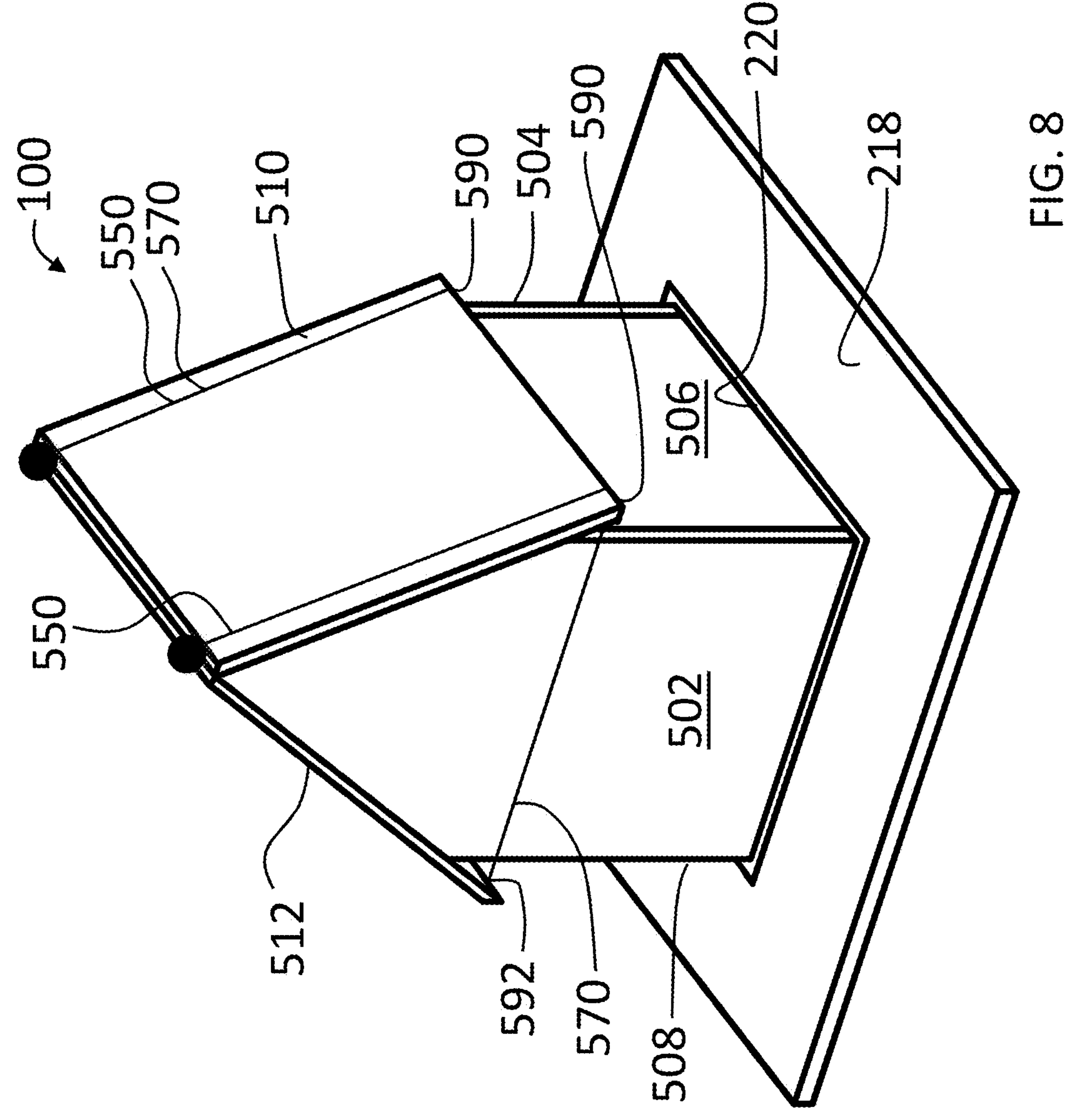
FIG. 8 is a perspective view of the decorative edible structure of FIG. 1 with an alternative embodiment of a retainer mounted in engagement with the roof panels of the decorative edible structure.

Referring now to FIGS. 7 and 8, shown therein are two alternative embodiments of a retainer. In FIG. 7, a retainer 450 can be seen. The retainer 450 is similar to the retainer 150, with like features indicated by like reference characters, incremented by 300. In the illustrated example, the retainer 450 includes a body 470 having a first hook surface 490 and a second hook surface 492. The first and second hook surfaces 490, 492 are spaced apart from each other along the body 470. As shown in FIG. 7, when in use, the hook surfaces 490, 492 engage first and second roof panels 410, 412 to temporarily inhibit sliding of the first and second roof panels downwardly along the inclined upper edges of the front and back walls 402, 404.

The body 470 of the retainer 450 may be, for example, a string, an elastic, or a wire. In the example illustrated, in which the body 470 is a string, the body 470 may be cinched proximate a ridge of the decorative edible structure 100. In the example illustrated, the string of the body is cinched by tying a knot in the string. In other examples, the body 470 may be cinched by applying a fastener to the string to secure the body 470 about the decorative edible structure 100.

Referring now to FIG. 8, another example of a retainer 550 has similarity to the retainer 450, with like features indicated by like reference characters, incremented by 100. In the example illustrated, a first roof panel 510 and a second roof panel 512, supported by a front wall 502 and a back wall 504, are in engagement with two retainers 550. The retainers 550 each include a body 570 having a first hook surface 590 and a second hook surface 592. In the example illustrated, the first and second hook surfaces 590, 592 are spaced apart from each other along their respective body 570.

Also shown in FIG. 8 is a base 220. In the example illustrated, the base 220 includes a canal 218 for receiving a volume of edible adhesive, a lowermost portion of a first side wall 506, a lowermost portion of a second side wall 508, and a lowermost portion of the front and back walls 502, 504.

Figure 9:
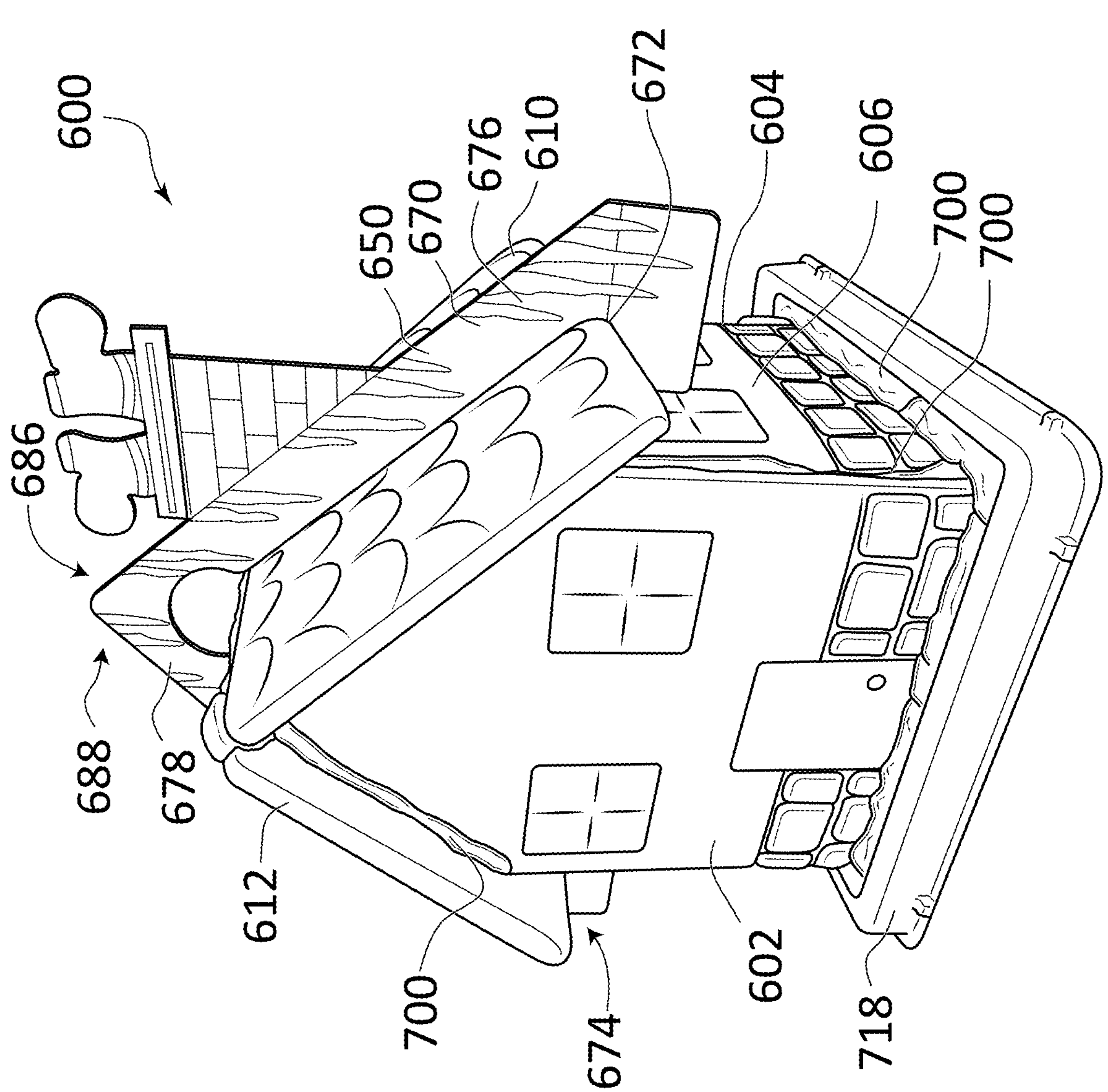
FIG. 9 is a perspective view of another example of a decorative edible structure with another example of a retainer mounted in engagement with the roof panels of the decorative edible structure.

Referring now to FIG. 9, another example of a retainer 650 is shown mounted on another example of a decorative edible structure 600. The decorative edible structure 600 is similar to the decorative edible structure 100, with like features indicated by like reference characters, incremented by 500. Additionally, the retainer 650 is similar to the retainer 350, with like features indicated by like reference characters, incremented by 300. In the example illustrated, the decorative edible structure includes a front wall 602 and a back wall 604 for supporting a first roof panel 610 and a second roof panel 612.

The retainer 650 includes a body 670 having a first arm 676 and a second arm 678. In the example illustrated, the retainer 650 includes a first hook surface 672 and a second hook surface 674. The first and second hook surfaces 672, 674 are spaced apart from each other along the body 670. The first and second hook surfaces 672, 674 are for holding in place the first and second roof panels 610, 612 at least while an edible adhesive 700, applied to upper inclined edges of the front and back walls 602, 604, sets.

In the example illustrated, the edible adhesive 700 connects the first and second roof panels to upper inclined edges of the front and back walls. The edible adhesive 700 also connects the front and back walls to a first side wall 606 and a second side wall 608. In the example illustrated, edible adhesive is also connecting the front wall 602, back wall 604, first side wall 606, and second side wall 608 to a base

718. The base 718 may be used when assembling a decorative edible structure as will be described below For example, once the walls of a decorative edible structure have been erected, one method for assembling a pair of roof panels to a front wall and a back wall of a decorative edible structure, wherein each of the front and back walls has a first inclined upper edge and second inclined upper edge defining a peak, may include the steps of: (a) applying a first bead of edible adhesive to each of the first inclined upper edges of the front and back walls; (b) after step (a), and before the first bead of edible adhesive sets, placing a first roof panel on the first bead of edible adhesive; (c) applying a second bead of edible adhesive to each of the second inclined upper edges of the front and back walls; (d) after step (c), and before the second bead of edible adhesive sets, placing a second roof panel on the second bead of edible adhesive; and (e) mounting a retainer to the decorative edible structure in engagement with the first and second roof panels to hold the first and second roof panels in position on the first and second edges at least until each of the first and second beads of edible adhesive has set.

Optionally, after each of the first and second beads of edible adhesive has set, the retainer may be removed without displacing either of the first and second roof panels. Alternatively, the retainer may be left in place after the adhesive has set to form a decoration on the decorative edible structure.

When assembling the decorative edible structure, the first and second roof panels may also be joined by a third bead of edible adhesive applied along an upper edge of each of the first and second roof panels.

A decorative edible structure may originate as a kit of parts to be assembled by a builder at a later date. A kit of parts for a decorative edible structure may include a pair of peaked walls, a pair of roof panels, and any one of retainers 150, 250, 350, 450, 550, and 650 as described above or a retainer having features from any two or more of the retainers described above. The kit of parts for a decorative edible structure may also include at least one of a volume of a hardening edible adhesive, a pair of side walls, a base, and a plurality of edible and non-edible decorations. The kit of parts for a decorative edible structure may also include instructions describing how to assemble the decorative edible structure using one of retainers 150, 250, 350, 450, 550, and 650.

In some examples, the kit of parts may include a panel, for example, a panel of cardboard or similar material, and the retainer 150, 250, 350, 650 may comprise a portion of the panel to be separated from a remainder of the panel. The panel may include frangible lines (e.g. perforated lines) defining the outline of the retainer, so that separating the retainer from the panel is facilitated by severing the frangible lines.

In some examples, the packaging may include a printed outline of the retainer 150, 250, 350, 650 along which a user can cut the panel, for example with a pair of scissors, to separate the retainer from the panel. In some examples, the instructions for using the retainer can be printed on the panel, and can include instructions for separating the retainer from the panel. In some examples, the kit of parts for a decorative edible structure can include packaging, such as a box or other container, for holding the parts when shipped to and/or displayed for sale in a store. In some examples, the packaging comprises the panel. For example, the panel can form one side of a box, and the remaining parts of the kit of parts can be held inside the box.

The invention claimed is:

1. A method for assembling a pair of roof panels to an edible front wall and an edible back wall of a decorative edible structure, the method comprising:

a) applying a first bead of edible adhesive to each of a first inclined upper edge of the edible front wall and a first inclined upper edge of the edible back wall;
b) after step (a), and before the first bead of edible adhesive sets, placing a first roof panel of the pair of roof panels on the first bead of edible adhesive applied to the first inclined upper edge of each of the edible front wall and the edible back wall;
c) applying a second bead of edible adhesive to each of a second inclined upper edge of the edible front wall and a second inclined upper edge of the edible back wall;
d) after step (c), and before the second bead of edible adhesive applied to the second inclined upper edge of each of the edible front wall and the edible back wall sets, placing a second roof panel of the pair of roof panels on the second bead of edible adhesive, wherein the second roof panel is inclined relative to the first roof panel by a peak angle;
e) picking up a retainer, the retainer having a planar body with a first arm extending along a first arm axis and a second arm fixed to the first arm and extending along a second arm axis, the first arm axis inclined relative to the second arm axis by a fixed incline angle matching the peak angle; and
f) after step (e), mounting the retainer to the decorative edible structure such that the first arm is disposed above the first roof panel, the second arm is disposed above the second roof panel, and a first hook surface on the first arm engages a first lower edge of the first roof panel and a second hook surface on the second arm engages a second lower edge of the second roof panel to hold the first and second roof panels in position on the first and second inclined upper edges at least until each of the first and second beads of edible adhesive has set.

2. The method of claim 1, further comprising after each of the first and second beads of edible adhesive has set, removing the retainer without displacing either of the first and second roof panels.

3. The method of claim 1, further comprising after each of the first and second beads of edible adhesive has set, leaving the retainer in place as a decoration on the decorative edible structure.

4. The method of claim 1, further comprising applying a third bead of edible adhesive along an upper edge of each of the first and second roof panels to join the first and second roof panels together.

5. The method of claim 1, wherein step (e) includes severing a cardboard panel along lines forming an outline of the retainer to separate the retainer from the cardboard panel.

6. A method for assembling a pair of roof panels to an edible front wall and an edible back wall of a decorative edible structure, the method comprising:

a) applying a first bead of edible adhesive to each of a first inclined upper edge of the edible front wall and a first inclined upper edge of the edible back wall;
b) placing a first roof panel of the pair of roof panels on the first bead of edible adhesive before the first bead of edible adhesive applied to the first inclined upper edge of each of the edible front wall and the edible back wall sets;
c) applying a second bead of edible adhesive to each of a second inclined upper edge of the edible front wall and a second inclined upper edge of the edible back wall;

d) placing a second roof panel of the pair of roof panels on the second bead of edible adhesive before the second bead of adhesive applied to the second inclined upper edge of each of the edible front wall and the edible back wall sets, wherein the second roof panel is inclined relative to the first roof panel by a peak angle;

e) mounting a retainer to the decorative edible structure, such that a first arm of the retainer is disposed above and follows a pitch of the first roof panel and a first hook surface on the first arm engages a first lower edge of the first roof panel, and a second arm of the retainer is disposed above and follows a pitch of the second roof panel and a second hook surface on the second arm engages a second lower edge of the second roof panel to hold the first and second roof panels in position on the first and second inclined upper edges at least until each of the first and second beads of edible adhesive has set, wherein the retainer comprising the first and second arms are formed of an integral, unitary, cardboard construction.

7. The method of claim 1 further comprising prior to the mounting of the retainer to the decorative edible structure, severing a cardboard panel along lines forming an outline of the retainer to separate the retainer from the cardboard panel.

8. A method for assembling a pair of roof panels to a front wall and a back wall of a decorative edible structure, wherein the front wall and the back wall are edible, and wherein the front wall has a first inclined upper edge and a second inclined upper edge and the back wall has a first inclined upper edge and second inclined upper edge, the first and second inclined upper edge of the front wall are inclined relative to one another by a peak angle and the first and the second inclined upper edge of the back wall are inclined relative to one another by the peak angle, the method comprising:

a) applying a first bead of edible adhesive to the first inclined upper edge of each of the front wall and the back wall;

b) after step (a), and before the first bead of edible adhesive sets, placing a first roof panel of the pair of roof panels on the first bead of edible adhesive applied to the first inclined upper edge of each of the front wall and the back wall;

c) applying a second bead of edible adhesive to the second inclined upper edge of each of the front wall and the back wall;

d) after step (c), and before the second bead of edible adhesive sets, placing a second roof panel of the pair of roof panels on the second bead of edible adhesive applied to the second inclined upper edge of each of the front wall and the back wall; and e) mounting a retainer to the decorative edible structure, the retainer having a planar body including a first arm extending along a first arm axis and a second arm fixed to the first arm and extending along a second arm axis, the first arm axis inclined relative to the second arm axis by a fixed incline angle matching the peak angle, the first arm including a first finger projecting from the first arm in the same direction as the second arm axis and having a first hook surface directed toward the second arm, and the second arm including a second finger projecting from the second arm in the same direction as the first arm axis and having a second hook surface directed toward the first arm, wherein the mounting of the retainer to the decorative edible structure causes the first hook surface and the second hook surface to engage respective lower edges of the first roof panel and the second roof panel to hold the first roof panel and the second roof panel in position on the first and second inclined edge of the front wall and the back wall, at least until the first bead of edible adhesive applied to the first inclined upper edge of each of the front wall and the back wall and the second bead of edible adhesive applied to the second inclined upper edge of each of the front wall and the back wall have set.

9. The method of claim 8, further comprising after each of the first and second beads of edible adhesive has set, removing the retainer without displacing either of the first and second roof panels.

10. The method of claim 8, further comprising after each of the first and second beads of edible adhesive has set, leaving the retainer in place as a decoration on the decorative edible structure.

11. The method of claim 8, further comprising applying a third bead of edible adhesive along an upper edge of each of the first and second roof panels to join the first and second roof panels together.

12. The method of claim 8, wherein step (e) includes, prior to the mounting severing a cardboard panel along lines forming an outline of the retainer to separate the retainer from the cardboard panel.

* * * * *